United States Patent
Kurosawa

(10) Patent No.: US 11,718,772 B2
(45) Date of Patent: Aug. 8, 2023

(54) CURABLE COMPOSITION, AND PRODUCTION METHOD OF JOINED STRUCTURE

(71) Applicant: TOKYO OHKA KOGYO CO., LTD., Kanagawa (JP)

(72) Inventor: Tsuyoshi Kurosawa, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 37 days.

(21) Appl. No.: 17/550,254

(22) Filed: Dec. 14, 2021

(65) Prior Publication Data

US 2022/0213361 A1 Jul. 7, 2022

(30) Foreign Application Priority Data

Dec. 24, 2020 (JP) .................. 2020-214982

(51) Int. Cl.
*C09J 163/00* (2006.01)

(52) U.S. Cl.
CPC .................. *C09J 163/00* (2013.01)

(58) Field of Classification Search
CPC ..................... C09J 163/00; C08G 59/027
See application file for complete search history.

(56) References Cited

U.S. PATENT DOCUMENTS

2002/0156190 A1* 10/2002 Sasaki ................... C09J 163/00 525/107
2021/0043785 A1 2/2021 Maeda et al.

FOREIGN PATENT DOCUMENTS

JP 2019-186317 10/2019

* cited by examiner

*Primary Examiner* — Daniel McNally
(74) *Attorney, Agent, or Firm* — Wenderoth, Lind & Ponack, L.L.P.

(57) ABSTRACT

Provided are a curable composition that exhibits favorable adhesiveness without heating at elevated temperatures, and a method for producing a joined structure using the curable composition. As a curable composition for use in forming one or more bonding layers bonding the two or more adherends, in which at least one of the two or more adherends includes a low heat-resistance material, a curable composition that contains an epoxy resin including a structural unit of a specific structure including an epoxy group, and yields a cured product exhibiting a water contact angle of 40° or more and 50° or less by heating at 80° C. or higher and 100° C. or lower and an exposure is used.

8 Claims, No Drawings

CURABLE COMPOSITION, AND PRODUCTION METHOD OF JOINED STRUCTURE

This application is based on and claims the benefit of priority from Japanese Patent Application No. 2020-214982, filed on 24 Dec. 2020, the content of which is incorporated herein by reference.

BACKGROUND OF THE INVENTION

Field of the Invention

The present invention relates to a curable composition, and a method for producing a joined structure using the curable composition.

Related Art

Conventionally, various thermosetting adhesive materials have been used for bonding between layers in the formation of various elements having a layered structure, etc. For example, Patent Document 1 proposes the use of benzocyclobutene, which is known to cure at 200° C. or higher, as a thermosetting bonding layer in the manufacture of a light-receiving element including a photodiode.

Patent Document 1: Japanese Unexamined Patent Application, Publication No. 2019-186317

SUMMARY OF THE INVENTION

However, as typified by organic EL elements (organic electroluminescent elements), etc., various functional elements often include less thermally resistant materials that are thermally deformed and/or thermally decomposed at elevated temperatures. Therefore, with regard to curable compositions for use in bonding an adherend, there is a need for a curable composition that exhibits favorable adhesiveness without heating at elevated temperatures.

The present invention takes the above circumstances into consideration, with an object of providing a curable composition that exhibits favorable adhesiveness without heating at elevated temperatures, and a method for producing a joined structure using the curable composition.

The present inventors discovered that the above object could be achieved by using a curable composition for use in forming the one or more bonding layers bonding the two or more adherends, wherein at least one of the two or more adherends includes a low heat-resistance material, the curable composition contains an epoxy resin including a structural unit of a specific structure including an epoxy group, and the curable composition yields a cured product exhibiting a water contact angle of 40° or more and 50° or less by heating at 80° C. or higher and 100° C. or lower and an exposure, and they were therefore able to complete the present invention. Specifically, the present invention provides the following.

A first aspect of the present invention relates to a curable composition for forming one or more bonding layers bonding two or more adherends,
the curable composition containing an epoxy resin having a mass average molecular weight of 1,000 or more and 50,000 or less,
wherein the epoxy resin has a repeating structure including a structural unit (g1) represented by the following formula (g1-1):

[Chem. 1]

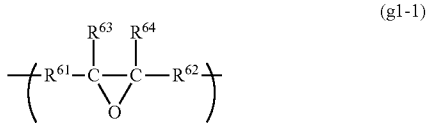

wherein in the formula (g1-1), $R^{61}$ and $R^{62}$ each independently represent a divalent hydrocarbon group which may have a substituent; and $R^{63}$ and $R^{64}$ each independently represent a hydrogen atom or an alkyl group,
wherein at least one of the two or more adherends include a low heat-resistance material, and
wherein the curable composition yields a cured product exhibiting a water contact angle of 40° or more and 50° or less by heating at 80° C. or higher and 100° C. or lower and an exposure.

A second aspect of the present invention relates to a method for producing a joined structure, the joined structure including two or more adherends being bonded via one or more bonding layers, at least one of the two or more adherends including a low heat-resistance material, the method including:
applying the curable composition according to the first aspect onto an adherend surface of at least one of the two or more adherends to form a coating film,
heating the coating film at 80° C. or higher and 100° C. or lower, and subsequently exposing the coating film, thereby curing the coating film, to form a bonding layer, and
bonding the adherend having the bonding layer to another one of the adherends.

The present invention can provide a curable composition that exhibits favorable adhesiveness without heating at elevated temperatures, and a method for producing a joined structure using the curable composition.

DETAILED DESCRIPTION OF THE INVENTION

<<Curable Composition>>

The curable composition is used for forming the one or more bonding layers bonding the two or more adherends. With respect to the curable composition, at least one of the two or more adherends includes a low heat-resistance material. The curable composition contains an epoxy resin having a mass average molecular weight of 1,000 or more and 50,000 or less. The epoxy resin has a repeating structure including a structural unit (g1) represented by the following formula (g1-1):

[Chem. 2]

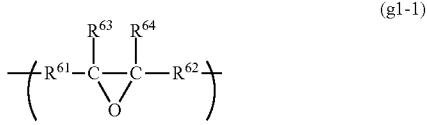

wherein in the formula (g1-1), $R^{61}$ and $R^{62}$ each independently represent a divalent hydrocarbon group which may have a substituent; and $R^{63}$ and $R^{64}$ each independently represent a hydrogen atom or an alkyl group. The curable composition containing the epoxy resin described above yields a cured product exhibiting a water contact angle of 40° or more and 50° or less by heating at 80° C. or higher and 100° C. or lower and an exposure.

As described above, the curable composition yields a cured product exhibiting a water contact angle of 40° or more and 50° or less by heating at 80° C. or higher and 100° C. or lower and an exposure. The cured product having a water contact angle within the range described above favorably adheres to adherends made from various materials.

Hereinafter, essential or optional components contained in the curable composition will be described.

<Epoxy Resin>

As described above, the curable composition contains the epoxy resin having a mass average molecular weight of 1,000 or more and 50,000 or less. The epoxy resin has a repeating structure including a structural unit (g1) represented by the following formula (g1-1):

[Chem. 3]

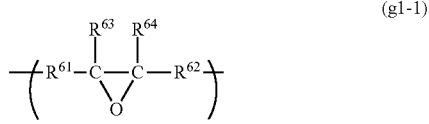

(g1-1)

wherein in the formula (g1-1), $R^{61}$ and $R^{62}$ each independently represent a divalent hydrocarbon group which may have a substituent; and $R^{63}$ and $R^{64}$ each independently represent a hydrogen atom or an alkyl group.

In the specification and the claims of the present application, the term "epoxy resin" refers to a resin having two or more epoxy groups within each molecule. The mass average molecular weight of the epoxy resin is 1,000 or more and 50,000 or less, preferably 2,000 or more and 40,000 or less, more preferably 3,000 or more and 30,000 or less, and most preferably 3,000 or more and 20,000 or less. When the mass average molecular weight of the epoxy resin is in the range specified above, a cured product of the curable composition exhibits favorable adhesiveness to adherends formed from various materials, and a curable composition with favorable coating properties is likely to be obtained. In the specification and the claims of the present application, the term "mass average molecular weight" refers to a polystyrene-equivalent mass average molecular weight value determined by gel permeation chromatography. Hereinafter, the mass average molecular weight may be designated as Mw.

[Structural Unit (g1)]

The epoxy resin has a repeating structure including a structural unit (g1) represented by the above formula (g1-1). In the formula (g1-1), $R^{61}$ and $R^{62}$ each independently represent a divalent hydrocarbon group which may have a substituent. $R^{63}$ and $R^{64}$ each independently represent a hydrogen atom, or an alkyl group.

In the formula (g1-1), $R^{61}$ and $R^{62}$ each independently represent a divalent hydrocarbon group which may have a substituent. The phrase that the divalent hydrocarbon group may "have a substituent" means that some or all of the hydrogen atoms within the divalent hydrocarbon group may be substituted with an atom other than a hydrogen atom or with a group.

The divalent hydrocarbon group for $R^{61}$ or $R^{62}$ may be an aliphatic hydrocarbon group, an aromatic hydrocarbon group, or a combination of an aliphatic hydrocarbon group and an aromatic hydrocarbon group. The term "aliphatic hydrocarbon group" describes a hydrocarbon group having no aromaticity. The aliphatic hydrocarbon group may be a saturated aliphatic hydrocarbon group, or an unsaturated aliphatic hydrocarbon group, and is preferably a saturated aliphatic hydrocarbon group.

Examples of the divalent aliphatic hydrocarbon group for $R^{61}$ or $R^{62}$ include linear or branched aliphatic hydrocarbon groups, and aliphatic hydrocarbon groups containing a ring in the structure thereof. The linear or branched aliphatic hydrocarbon group has preferably 1 or more and 10 or less carbon atoms, more preferably 1 or more and 8 or less carbon atoms, still more preferably 1 or more and 5 or less carbon atoms, and most preferably 1 or 2 carbon atoms.

The linear aliphatic hydrocarbon group is preferably a linear alkylene group. Specific examples of the linear alkylene group include a methylene group, an ethylene group (ethane-1,2-diyl group), a trimethylene group, a tetramethylene group, and a pentamethylene group. The branched aliphatic hydrocarbon group is preferably a branched alkylene group. Specific examples of the branched alkylene group include alkylalkylene groups, including alkylmethylene groups such as an ethane-1,1-diyl group (—CH(CH$_3$)—), a propane-1,1-diyl group (—CH(CH$_2$CH$_3$)—), a propane-2,2-diyl group (—C(CH$_3$)$_2$—), butane-2,2-diyl group (—C(CH$_3$) (CH$_2$CH$_3$)—), a pentane-2,2-diyl group (—C(CH$_3$) (CH$_2$CH$_2$CH$_3$)—), and a pentane-3,3-diyl group (—C(CH$_2$CH$_3$)$_2$—); alkylethylene groups such as a propane-1,2-diyl group (—CH(CH$_3$)CH$_2$—), a butane-2,3-diyl group (—CH(CH$_3$)CH(CH$_3$)—), a 2-methylpropane-1,1-diyl group (—C(CH$_3$)$_2$CH$_2$—), a butane-1,2-diyl group (—CH(CH$_2$CH$_3$)CH$_2$—), and a 2-ethylbutane-1,2-diyl group (—C(CH$_2$CH$_3$)$_2$—CH$_2$—); alkyltrimethylene groups such as a butane-1,3-diyl group (—CH(CH$_3$)CH$_2$CH$_2$—), and a 2-methylpropane-1,3-diyl group (—CH$_2$CH(CH$_3$)CH$_2$—); and alkyltetramethylene groups such as a pentane-1,4-diyl group (—CH(CH$_3$) CH$_2$CH$_2$CH$_2$—), and a 2-methylbutane-1,4-diyl group (—CH$_2$CH(CH$_3$)CH$_2$CH$_2$—). As the alkyl group within the alkylalkylene group, a linear alkyl group having 1 or more and 5 or less carbon atoms is preferable.

The linear or branched aliphatic hydrocarbon group (hereinafter, also referred to as a "chain-like aliphatic hydrocarbon group") may or may not have a substituent. Examples of the substituent include a fluorine atom, a fluorinated alkyl group having 1 or more and 5 or less carbon atoms, and an oxygen atom (═O).

Examples of the aliphatic hydrocarbon group containing a ring in the structure thereof include cyclic aliphatic hydrocarbon groups (groups in which two or more hydrogen atoms have been removed from an aliphatic hydrocarbon ring), and groups in which the cyclic aliphatic hydrocarbon group is bonded to the terminal of the aforementioned chain-like aliphatic hydrocarbon group or interposed within the chain of the aforementioned chain-like aliphatic hydrocarbon group. The cyclic aliphatic hydrocarbon group has preferably 3 or more and 20 or less carbon atoms, and more preferably 3 or more and 12 or less carbon atoms.

The cyclic aliphatic hydrocarbon group may be either a polycyclic group or a monocyclic group. As the monocyclic group, a group in which two or more hydrogen atoms have been removed from a monocycloalkane having 3 or more and 6 or less carbon atoms is preferable. Examples of the monocycloalkane include cyclopentane and cyclohexane. As the polycyclic group, a group in which two or more hydrogen atoms have been removed from a polycycloalkane having 7 or more and 12 or less carbon atoms is preferable. Examples of the polycycloalkane include adamantane, norbornane, isobornane, tricyclodecane, and tetracyclododecane. The cyclic aliphatic hydrocarbon group may have a substituent. Examples of the substituent include an alkyl group having 1 or more and 5 or less carbon atoms, a fluorine atom, a fluorinated alkyl group having 1 or more and 5 or less carbon atoms, and an oxygen atom (=O).

Examples of the aromatic hydrocarbon group for $R^{61}$ or $R^{62}$ include divalent aromatic hydrocarbon groups in which an additional one hydrogen atom has been removed from the aromatic hydrocarbon nucleus of a monovalent aromatic hydrocarbon group such as a phenyl group, a biphenyl group, a fluorenyl group, a naphthyl group, an anthryl group or a phenanthryl group. The aromatic hydrocarbon group may have a substituent. Examples of the substituent include an alkyl group having 1 or more and 5 or less carbon atoms, a fluorine atom, a fluorinated alkyl group having 1 or more and 5 or less carbon atoms, and an oxygen atom (=O).

When the divalent hydrocarbon group for $R^{61}$ or $R^{62}$ is a combination of an aliphatic hydrocarbon group and an aromatic hydrocarbon group, examples of the divalent hydrocarbon group include groups in which an additional one hydrogen atom has been removed from the aromatic hydrocarbon nucleus of an aralkyl group such as a benzyl group, a phenethyl group, a 1-naphthylmethyl group, a 2-naphthylmethyl group, a 1-naphthylethyl group, and a 2-naphthylethyl group. The divalent hydrocarbon group constituted of a combination of an aliphatic hydrocarbon group and an aromatic hydrocarbon group may have a substituent. Examples of the substituent include an alkyl group having 1 or more and 5 or less carbon atoms, a fluorine atom, a fluorinated alkyl group having 1 or more and 5 or less carbon atoms, and an oxygen atom (=O).

As $R^{61}$ or $R^{62}$, a linear aliphatic hydrocarbon group is preferable, a linear alkylene group is more preferable, a linear alkylene group having 1 or more and 5 or less carbon atoms is still more preferable, and a methylene group is most preferable.

In the formula (g1-1), $R^{63}$ and $R^{64}$ each independently represent a hydrogen atom or an alkyl group. The alkyl group for $R^{63}$ or $R^{64}$ is preferably an alkyl group having 1 or more and 5 or less carbon atoms, more preferably a methyl group or an ethyl group, and particularly preferably a methyl group. Preferably, $R^{63}$ and $R^{64}$ each independently represent a hydrogen atom or a methyl group.

Preferable specific examples of the structural unit represented by the formula (g1-1) include a structural unit represented by the following formula (g1-1-1).

[Chem. 4]

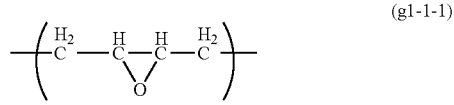

(g1-1-1)

The amount of the structural unit (g1) represented by the formula (g1-1) in the epoxy resin is not particularly limited so long as a cured product exhibiting a water contact angle of 40° or more and 50° or less can be formed using the curable composition, by heating at 80° C. or higher and 100° C. or lower and an exposure. The water contact angle of the cured product can be adjusted by tuning an epoxy equivalent of the epoxy resin, adding to the curable composition a small amount of a resin having a hydrophilic group unreactive with an epoxy group such as a hydroxyl group or a polyoxyalkylene group, or adding to the curable composition a small amount of a resin having a hydrophobic group such as a fluorinated alkyl group.

The epoxy resin is preferably a homo/copolymer including the structural unit (g1) represented by the formula (g1-1). The epoxy resin is more preferably a homo/copolymer including a structural unit (G) represented by the following formula (G-1). In the formula (G-1), g6 and g7 each independently represent an integer of 1 or more and 5 or less, preferably an integer of 1 or more and 3 or less, and more preferably 1.

[Chem. 5]

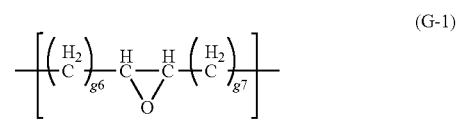

(G-1)

A structural unit other than the structural unit (g1) in the epoxy resin is not particularly limited, and examples thereof include structural unit derived from the following compounds. For example, diene compounds such as butadiene and isoprene, and epoxydiene compounds such as epoxybutadiene and epoxyisoprene can be mentioned.

The amount of the structural unit (g1) in the epoxy resin is preferably 5% by mass or more, more preferably 20% by mass or more, and still more preferably 30% by mass or more based on the combined total of all the structural units of the epoxy resin in terms of ease in forming a cured product exhibiting a water contact angle within the desired range by heating at 80° C. or higher and 100° C. or lower and an exposure. The upper limit of the amount of the structural unit (g1) in the epoxy resin is preferably 100 mass mol %, and may be 80 mol %. The epoxy resin including the structural unit (g1) can be obtained by any known procedure including Prilezhaev epoxidation. Alternatively, an epoxidizing agent may be reacted with a polybutadiene resin. Organic peroxyacids such as peracetic acid, performic acid, perbenzoic acid, m-chloroperbenzoic acid and perpropionic acid, and organic hydroperoxides such as hydrogen peroxide, tert-butyl hydroperoxide and cumene hydroperoxide may be used as the epoxidizing agent.

The dispersity (Mw/Mn) of the epoxy resin is preferably 1.0 or more and 6.5 or less, more preferably 1.5 or more and 6 or less, and most preferably 1.5 or more and 5 or less. Here, "Mn" is the number average molecular weight.

The amount of the epoxy resin in the curable composition is preferably 0.010% by mass or more and 0.050% by mass or less, more preferably 0.010% by mass or more and 0.040% by mass or less, and still more preferably 0.015% by mass or more and 0.035% by mass or less based on the mass of the curable composition. The range specified above allows for the formation of a bonding layer as a thin film. In addition, optical properties of the structure including the resulting cured product are favorably maintained.

When the curable composition contains the epoxy resin in an amount within the range specified above, favorable bonding can be achieved between the cured product of the curable composition and the adherend, and additionally, the coating properties of the curable composition over the adherend are favorable.

<Other Components>

Examples of components other than the epoxy resin, which may be contained in the curable composition, include organic solvents, sulfur-containing organic compounds, nitrogen-containing organic compounds, surfactants, organic acids, photoacid generators, photobase generators, and colorants such as dyes and pigments.

In some cases, high transparency is required for the cured product of the curable composition. In such cases, the curable composition preferably contains no colorant such as a dye or a pigment.

In these cases, the cured product of the curable composition preferably presents a total light transmittance of 98% or more, when the total light transmittance was measured using a 450 nm-thick film of the cured product as a sample. When the adherend (or a low heat-resistance material of the adherend) includes an organic light-emitting element, a light-emitting layer containing a light-emitting substance, an organic layer including a light-emitting layer containing a light-emitting substance, an electron transport layer, or a hole transport layer, a cured product of the curable composition may be required to exhibit adhesiveness in a thin film state. In this case, the curable composition preferably contains no other component described above. In addition, the proportion of the mass of the epoxy resin to the mass of the solid components in the curable composition is preferably 90% by mass or more and 100% by mass or less, and more preferably 99% by mass or more and 100% by mass or less.

From the viewpoint of the coating properties, the curable composition preferably contains an organic solvent. The organic solvent is not particularly limited so long as the organic solvent is capable of dissolving the epoxy resin and forming a homogeneous solution. For example, organic solvents generally added to various resist compositions may be used as the organic solvent. Specific examples of the organic solvent include: lactones such as γ-butyrolactone; ketones such as acetone, methyl ethyl ketone, cyclohexanone, and methyl n-pentyl ketone, methyl isopentyl ketone, and 2-heptanone; polyhydric alcohols such as ethylene glycol, diethylene glycol, propylene glycol, and dipropylene glycol; glycol derivatives having an ester bond, such as ethylene glycol monoacetate, diethylene glycol monoacetate, propylene glycol monoacetate, and dipropylene glycol monoacetate; monoalkyl ethers including monomethyl ethers, monoethyl ethers, monopropyl ethers, and monobutyl ethers of the aforementioned polyhydric alcohols or the aforementioned glycol derivatives having an ester bond; monophenyl ethers of the aforementioned polyhydric alcohols or the aforementioned glycol derivatives having an ester bond; cyclic ethers such as dioxane; esters such as methyl lactate, ethyl lactate (EL), methyl acetate, ethyl acetate, butyl acetate, methyl pyruvate, ethyl pyruvate, methyl methoxypropionate, and ethyl ethoxypropionate; aromatic organic solvents such as anisole, ethyl benzyl ether, cresyl methyl ether, diphenyl ether, dibenzyl ether, phenetole, butyl phenyl ether, ethylbenzene, diethylbenzene, pentylbenzene, isopropylbenzene, toluene, xylene, cymene, and mesitylene. These organic solvents can be used individually, or as a mixed solvent containing two or more different solvents.

The curable composition can be obtained by homogeneously mixing the aforementioned components in the respective desired amounts.

<<Production Method of Joined Structure>>

The method for producing a joined structure includes bonding two or more adherends via one or more bonding layers. At least one of the two or more adherends includes a low heat-resistance material.

The aforementioned production method of the joined structure includes:

applying the curable composition described above to an adherend surface of at least one of the two or more adherends to form a coating film, heating the coating film at 80° C. or higher and 100° C. or lower, and subsequently exposing the coating film, thereby curing the coating film, to form a bonding layer, and bonding the adherend having the bonding layer to another one of the adherends.

The curable composition described above yields a cured product with favorable adhesiveness by heating the curable composition at a temperature of 80° C. or higher and 100° C. or lower, followed by an exposure. Accordingly, even when at least one of the two or more adherends includes a low heat-resistance material, a bonded structure can be produced with the prevention of the performance deterioration, thermal decomposition and thermal deformation of the low heat-resistance material.

Herein, the low heat-resistance material refers to an organic light-emitting element, a light-emitting layer containing a light-emitting substance, an organic layer including a light-emitting layer containing a light-emitting substance, an electron transport layer, a hole transport layer, a resin material having a glass transition temperature of 100° C. or lower, and/or a material which decomposes at 100° C. The organic light-emitting element refers to an organic electroluminescence (EL) element that is a field emission element, and the performance of such an element is known to be degraded by heat at 100° C. or higher (Japanese Unexamined Patent Application, Publication No. 2009-117576). Generally, the organic light-emitting element has a substrate, a light-emitting layer or organic light-emitting layer for emitting light, electrodes, and an encapsulating layer, and the like. The light-emitting layer containing a light-emitting substance refers to the light-emitting layer in the aforementioned organic light-emitting element. The organic layer including a light-emitting layer containing a light-emitting substance refers to the organic light-emitting layer in the aforementioned organic light-emitting element. The electron transport layer refers to the electron transport layer in the aforementioned organic light-emitting element. The hole transport layer refers to the hole transport layer in the aforementioned organic light-emitting element. The resin material having a glass transition temperature of 100° C. or lower refers to a resin material having a glass transition temperature of 100° C. or lower as determined by differential scanning calorimetry (DSC measurement). Further, the material which decomposes at 100° C. refers to a material having an initial decomposition temperature of 100° C. or lower as determined by thermogravimetry-differential thermal analysis (TG-DTA measurement). The initial decomposition temperature means a temperature at which a weight loss starts due to thermal decomposition.

Examples of the resin material having a glass transition temperature of 100° C. or lower include polyethylene, polypropylene, polyvinyl chloride, ABS resins, polymethyl methacrylate, nylon 6, nylon 6,6, polyacetal resins, polyurethane resins, polylactic acid, EVA resins, polyvinylidene fluoride, polybutylene terephthalate resins, polyethylene terephthalate resins, PEDOT (poly(3,4-ethylenedioxythiophene)), and PFO (polydioctylfluorene). Further, acrylic resins described in Japanese Unexamined Patent Application, Publication No. 2010-204199 may be used.

The adherend is preferably a part of the organic EL element, since many of the aforementioned low heat-resistance materials are used therein. For example, a part of the organic EL as the adherend includes at least one of the light-emitting layer containing a light-emitting substance, the organic layer including a light-emitting layer containing a light-emitting substance, the electron transport layer, the hole transport layer, and the organic light-emitting layer, for the organic EL element.

A method for applying the curable composition to an adherend surface in at least one of the two or more adherends is not particularly limited. For example, when the adherend surface is planar, the curable composition may be applied to the adherend surface using a roll coater, a spray coater, a slit coater, or the like. When the adherend has a sheet-like shape or a plate-like shape, and the curable composition is applied to a main surface of the sheet-like or plate-like adherend, a spinner may be used. When the adherend surface is curved or irregularly shaped, the curable composition is preferably applied using a spray coater. Incidentally, the adherend surface may have roughness so long as the application of the curable composition by means of a roll coater, a spray coater, a slit coater, a spinner or the like is possible.

The curable composition may be applied either to one of the two adherend surfaces facing each other during the bonding of the adherends, or to both of the two adherend surfaces.

The thickness of the coating film is not particularly limited, and may be appropriately adjusted according to the thickness of a bonding layer formed after the curing of the coating film.

After the formation of the coating film, the coating film is first heated at 80° C. or higher and 100° C. or lower. Heating at a temperature within such a range enables the curing of the coating film to partially proceed while preventing the thermal decomposition and/or thermal deformation of the low heat-resistance material contained in the adherend. In addition, heating of the coating film at a temperature within the aforementioned range makes it easy to form a bonding layer constituted of a cured product exhibiting a water contact angle of 40° or more and 50° or less, by a subsequent exposure.

The heating temperature is preferably 80° C. or higher and 95° C. or lower, and more preferably 85° C. or higher and 95° C. or lower. The heating time is not particularly limited, and is preferably 5 seconds or more and 1 hour or less, more preferably 10 seconds or more and 30 minutes or less, still more preferably 20 seconds or more and 10 minutes or less, and particularly preferably 30 seconds or more and 5 minutes or less.

Then, the heated coating film is exposed. The exposure is performed via the application of actinic radiation such as an ultraviolet ray or an excimer laser beam. Examples of a light source of the actinic radiation include low-pressure mercury vapor lamps, high-pressure mercury vapor lamps, ultra-high-pressure mercury vapor lamps, chemical lamps, and excimer laser generators. The energy dose applied may vary depending on the composition of a curable composition, and may be, for example, about 500 mJ/cm$^2$ or more and about 5,000 mJ/cm$^2$ or less.

After the heating and exposure described above, a bonding layer constituted of a cured product exhibiting a water contact angle of 40° or more and 50° or less is formed. It is considered that such a cured product has a certain number of hydroxyl groups generated in the reactions involving the epoxy groups, and the interaction between the hydroxyl groups and the adherend causes the adherend to be favorably bound via the bonding layer constituted of the cured product. The thickness of the bonding layer constituted of the cured product formed thus is, for example, 2 Å or more and 1,000 nm or less, and preferably 2 Å or more and 30 nm or less.

When the low heat-resistance material includes the organic light-emitting element, the light-emitting layer containing a light-emitting substance, the organic layer including a light-emitting layer containing a light-emitting substance, the electron transport layer, or the hole transport layer, the thickness is preferably 30 nm or less, more preferably 2 Å or more and 5 nm or less, and still more preferably 3 Å or more and 1 nm or less in terms of optical properties of the material.

Then, the adherend provided with the bonding layer is bonded to another one of the adherends. Typically, in the adherend provided with the aforementioned coating film, the coating film is heated and exposed to form the bonding layer, and then the bonding layer is bonded to another one of the adherends. Alternatively, when the adherend is transparent, the aforementioned coating film may be heated and exposed while two or more adherends are joined via the coating film, such that a bonding layer exhibiting adhesiveness may be formed between the adherends.

EXAMPLES

In the following, the present invention is described in more detail by way of Examples, but the present invention is not limited to these Examples.

Example 1

A curable composition was used which was prepared by dissolving an epoxy homopolymer (Mw: 10,000) having the structural unit represented by the formula (g1-1-1) in propylene glycol monomethyl ether acetate to form an epoxy polymer solution (epoxy polymer concentration of 0.020% by mass). This curable composition was applied to a glass substrate by spin coating to form a coating film. The coating film formed thus was heated at 90° C. for 60 seconds. Then, the heated coating film was exposed under the following conditions to form a bonding layer having a thickness of 450 nm. The thickness of the bonding layer was measured using a resist film thickness measurement device NanoSpec (manufactured by Nanometrics). Using Dropmaster 700 (manufactured by Kyowa Interface Science Co., LTD.), a pure water droplet (1.8 µL) was dropped onto the surface of the substrate, and the contact angle of water on the surface of the bonding layer was measured 10 seconds after the dropping. The result showed that the water contact angle was 41.5°. Further, the total light transmittance of the bonding layer was measured using MCPD-3000 (manufactured by Otsuka Electronics Co., Ltd.) in a measurement wavelength range of 0 to 2,000 nm, and the total light transmittance was found to be 98% or more.

<Exposure Conditions>
Exposure system: HMW-615N (low-pressure mercury vapor lamp manufactured by ORC MANUFACTURING CO., LTD.);
exposure wavelength: g-line (436 nm), h-line (405 nm), and i-line (365 nm) mixed wavelength; and
exposure dose: 3,000 mJ/cm$^2$.

Example 2

A bonding layer having a thickness of 450 nm was formed in the same manner as in Example 1 except that the exposure dose was changed to 1,000 mJ/cm$^2$. The contact angle of water on the bonding layer was measured in the same manner as in Example 1, and was found to be 45.6°. Further, the total light transmittance of the bonding layer was measured in the same manner as in Example 1, and was found to be 98% or more.

Example 3

A bonding layer having a thickness of 450 nm was formed in the same manner as in Example 1 except that the exposure dose was changed to 2,000 mJ/cm². The contact angle of water on the bonding layer was measured in the same manner as in Example 1, and was found to be 43.4°. Further, the total light transmittance of the bonding layer was measured in the same manner as in Example 1, and was found to be 98% or more.

Example 4

The curable composition used in Example 1 was applied to a silicon substrate by spin coating, to form a coating film. The coating film formed thus was heated at 90° C. for 60 seconds. Then, the heated coating film was exposed under the following conditions to form a bonding layer having a thickness of 5 Å. The thickness of the bonding layer was measured using a resist film thickness measurement device NanoSpec (manufactured by Nanometrics).
<Exposure Conditions>
exposure system: HMW-615N (low-pressure mercury vapor lamp manufactured by ORC MANUFACTURING CO., LTD.);
exposure wavelength: g-line (436 nm), h-line (405 nm), i-line (365 nm) mixed wavelength; and
exposure dose: 3,000 mJ/cm².

Then, a resin solution of an acrylic resin (Mw: 9,000) prepared by copolymerizing 4-hydroxyphenyl methacrylate, glycidyl methacrylate, and 3,4-epoxycyclohexylmethyl methacrylate in a molar ratio of 40:50:10 (concentration: 30% by mass, solvent:propylene glycol monomethyl ether acetate) was applied to the bonding layer by spin coating to form a coating film, and then the coating film was heated at 90° C. for 90 seconds, to form a resin film having a thickness of 500 nm. A cross-hatch test was performed on the formed resin film, wherein cuts (cross-hatch) were made such that a grid of 10 squares by 10 squares was formed. The length of one side of each square was 1 mm. After the cross-hatch test, the resin film was observed, and no peeling of the resin film was found in the grid section. After the cross-hatch test, a tape test was performed on the grid section of the resin film in accordance with ASTM D3359-09e2. The resin film after the tape test was observed, and no peeling of the resin film was found in the grid section. Furthermore, after the tape test, an alkaline development test was performed, wherein the silicon substrate was immersed in an alkaline developing solution (aqueous tetramethylammonium hydroxide solution of a concentration of 2.38% by mass) at room temperature for 60 seconds, followed by rinsing with pure water and air drying. After the alkaline development test, the resin film was observed, and neither peeling of the resin film in the grid section nor penetration of the developing solution into the resin film from the cuts in the grid section was found.

Example 5

The same tests as in Example 4 were performed except that the exposure dose was changed to 1,000 mJ/cm². The results showed that no peeling of the resin film was found after the cross-hatch test, after the tape test, and after the alkaline development test, and the penetration of only a very small amount of the alkaline developing solution was found after the alkaline development test.

Comparative Example 1

The same tests as in Example 4 were performed except that the exposure was not performed. The results showed that no peeling of the resin film was found after the cross-hatch test, after the tape test, and after the alkaline development test, but significant penetration of the alkaline developing solution was found after the alkaline development test.

Comparative Example 2

The same tests as in Example 4 were performed except that no bonding layer was formed, and the resin film was formed directly on the silicon substrate. The results showed that no peeling of the resin film was found after the cross-hatch test and after the tape test. However, significant peeling of the resin film was found after the alkaline development test.

What is claimed is:

1. A curable composition for use in forming one or more bonding layers bonding two or more adherends, at least one of the two or more adherends comprising a low heat-resistance material, the curable composition comprising an epoxy resin having a mass average molecular weight of 1,000 or more and 50,000 or less,
wherein the epoxy resin has a repeating structure comprising a structural unit (g1) represented by formula (g1-1):

[Chem. 1]

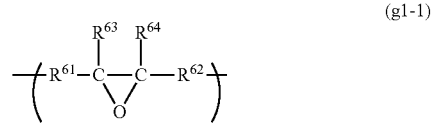

(g1-1)

wherein in the formula (g1-1), $R^{61}$ and $R^{62}$ each independently represent a divalent hydrocarbon group which may have a substituent; and $R^{63}$ and $R^{64}$ each independently represent a hydrogen atom or an alkyl group, and
wherein the curable composition yields a cured product exhibiting a water contact angle of 40° or more and 50° or less by heating at 80° C. or higher and 100° C. or lower and an exposure.

2. The curable composition according to claim 1, wherein a proportion of a mass of the epoxy resin to a mass of the curable composition is 0.010% by mass or more and 0.040% by mass or less.

3. The curable composition according to claim 1, wherein a proportion of a mole number of the structural unit (g1) based on a combined total of all structural units constituting the epoxy resin is 10 mol % or more.

4. The curable composition according to claim 1, wherein the low heat-resistance material is at least one of an electron transport layer, a hole transport layer, and an organic light-emitting layer, for an organic EL element.

5. The curable composition according to claim 1, yielding a cured product exhibiting a total light transmittance of 98% or more as measured using a 450 nm-thick sample.

6. A method for producing a joined structure, the joined structure comprising two or more adherends being bonded via one or more bonding layers, and at least one of the two or more adherends comprising a low heat-resistance material, the method comprising:
- applying the curable composition according to claim 1 to an adherend surface of at least one of the two or more adherends to form a coating film,
- heating the coating film at 80° C. or higher and 100° C. or lower, and subsequently exposing the coating film, thereby curing the coating film, to form the bonding layer, and
- bonding the adherend having the bonding layer to another one of the adherends.

7. The method for producing a joined structure according to claim 6, wherein the bonding layer has a thickness of 30 nm or less.

8. The method for producing a joined structure according to claim 6, wherein the low heat-resistance material is at least one of: a light-emitting layer comprising a light-emitting substance; an organic layer comprising a light-emitting layer comprising a light-emitting substance; an electron transport layer; a hole transport layer; and an organic light-emitting layer, for an organic EL element.

* * * * *